United States Patent
Chai et al.

(10) Patent No.: US 10,877,516 B2
(45) Date of Patent: Dec. 29, 2020

(54) ELECTRONIC DEVICE

(71) Applicants: Wei-Ning Chai, Taipei (TW); Chen-Hsien Cheng, Taipei (TW); Hsien-Tang Liao, Taipei (TW); Yi-Ju Liao, Taipei (TW)

(72) Inventors: Wei-Ning Chai, Taipei (TW); Chen-Hsien Cheng, Taipei (TW); Hsien-Tang Liao, Taipei (TW); Yi-Ju Liao, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/404,751

(22) Filed: May 7, 2019

(65) Prior Publication Data
US 2019/0346881 A1 Nov. 14, 2019

Related U.S. Application Data

(60) Provisional application No. 62/667,618, filed on May 7, 2018.

(51) Int. Cl.
*G06F 1/16* (2006.01)

(52) U.S. Cl.
CPC .......... *G06F 1/1616* (2013.01); *G06F 1/1656* (2013.01); *G06F 1/1681* (2013.01)

(58) Field of Classification Search
CPC .... G06F 1/1616; G06F 1/1643; G06F 1/1669; G06F 1/1654; G06F 1/1675; G06F 1/1681; G06F 1/162
See application file for complete search history.

(56) References Cited

U.S. PATENT DOCUMENTS

| | | | | |
|---|---|---|---|---|
| 6,636,204 | B2* | 10/2003 | Santoh | G06F 1/1616 345/169 |
| 8,902,583 | B2* | 12/2014 | Cheng | G06F 1/1656 248/316.2 |
| 9,433,111 | B2* | 8/2016 | Myung | H05K 5/0017 |
| 9,483,083 | B1* | 11/2016 | Zaloom | G06F 1/1679 |
| 10,078,352 | B2 | 9/2018 | Liang | |
| 2003/0026068 | A1* | 2/2003 | Tsai | G06F 1/1616 361/679.55 |
| 2005/0090206 | A1* | 4/2005 | Hyun | G06F 1/1616 455/90.3 |

(Continued)

FOREIGN PATENT DOCUMENTS

| | | |
|---|---|---|
| CN | 104345792 | 10/2017 |
| TW | 201447537 | 12/2014 |

*Primary Examiner* — Anthony Q Edwards
(74) *Attorney, Agent, or Firm* — JCIPRNET

(57) ABSTRACT

An electronic device includes a first body, a second body, a function element, and a coupling assembly. The first body has a first sleeve. The second body has a second sleeve. The function element is disposed on the first body and the second body, and two ends of the function element are respectively disposed through the first sleeve and the second sleeve. The coupling assembly is detachably connected to the function element and disposed on the first sleeve or the second sleeve. Specifically, the first body and the second body are adapted to be opened or closed relatively through the function element and the coupling assembly, and the function element is adapted to be separated from the first sleeve and the second sleeve along an axial direction.

19 Claims, 14 Drawing Sheets

(56) References Cited

U.S. PATENT DOCUMENTS

| | | | |
|---|---|---|---|
| 2007/0047191 A1* | 3/2007 | Goto | G06F 1/1616 |
| | | | 361/679.02 |
| 2007/0097087 A1* | 5/2007 | Homer | G06F 1/1681 |
| | | | 345/173 |
| 2007/0115618 A1* | 5/2007 | Love | G06F 1/1616 |
| | | | 361/679.55 |
| 2009/0153524 A1* | 6/2009 | Tang | G06F 1/1616 |
| | | | 345/179 |
| 2010/0083162 A1* | 4/2010 | Hernandez | G06F 1/1616 |
| | | | 715/776 |
| 2010/0333215 A1* | 12/2010 | Wang | G06F 1/1626 |
| | | | 726/34 |
| 2012/0098752 A1* | 4/2012 | Glenn | G06F 1/1616 |
| | | | 345/173 |
| 2014/0063710 A1* | 3/2014 | Myung | H05K 5/0017 |
| | | | 361/679.4 |
| 2014/0259532 A1* | 9/2014 | Millard | E05D 11/1028 |
| | | | 16/326 |
| 2016/0147314 A1* | 5/2016 | Bujsaim | G06F 3/0416 |
| | | | 345/173 |
| 2018/0107254 A1* | 4/2018 | Godfrey | G06F 1/1681 |

* cited by examiner

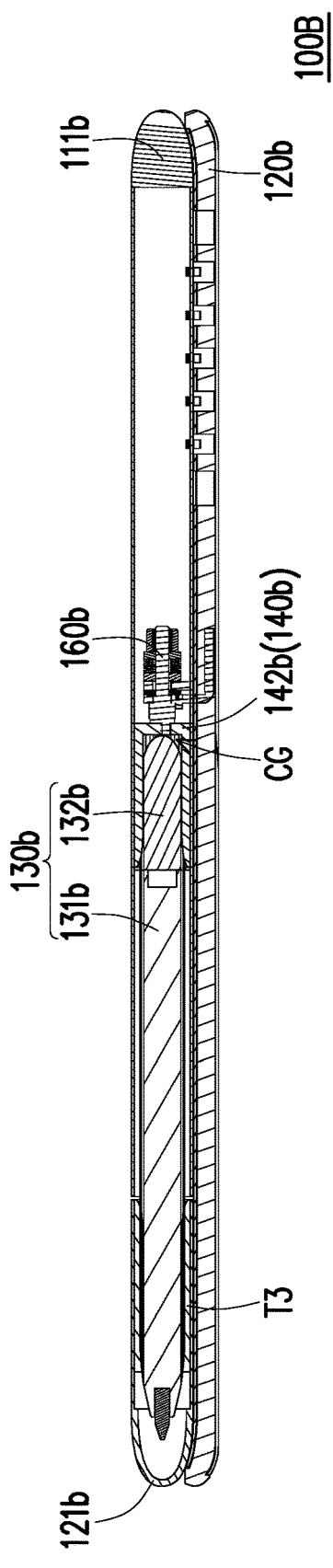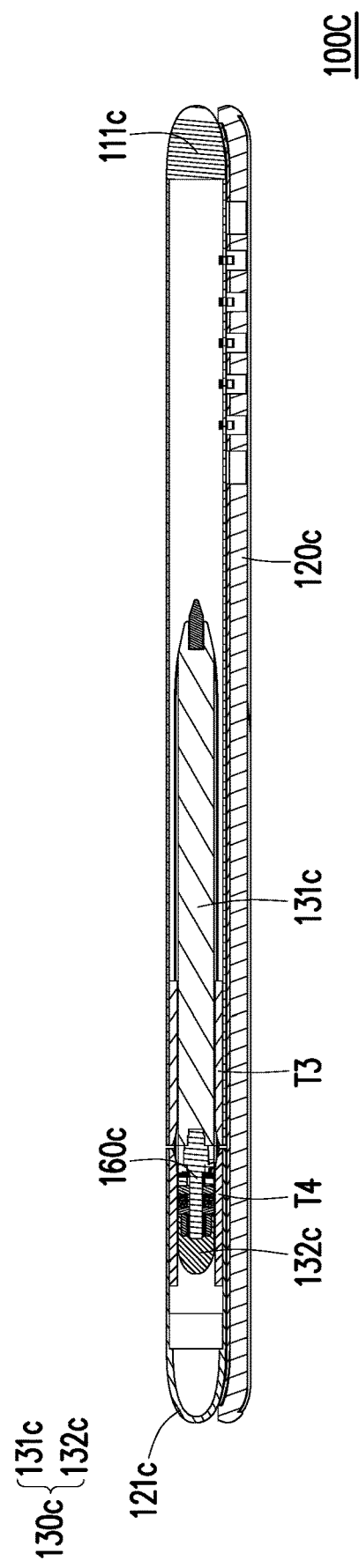
FIG. 5A
FIG. 5B

ELECTRONIC DEVICE

CROSS-REFERENCE TO RELATED APPLICATION

This application claims the priority benefit of U.S. provisional application Ser. No. 62/667,618, filed on May 7, 2018. The entirety of the above-mentioned patent application is hereby incorporated by reference herein and made a part of specification.

BACKGROUND OF THE DISCLOSURE

Field of the Disclosure

The present disclosure relates to an electronic device, and more particularly to an electronic device integrating a tablet computer and a keyboard.

Description of Related Art

Existing tablet computers have the advantages of being convenient to carry and small size, but they are not suitable for display in the document mode because the display range of the screen is too small, and the user's hands cannot smoothly operate the touch keyboard. Therefore, an external keyboard that can be connected to a tablet computer has been developed so that the tablet computer can be switched for use as a notebook computer. Usually a magnet or a structure that can be engaged with each other is adopted, and a rotating shaft is further combined so that the tablet computer and the external keyboard are suitable for being opened or closed relatively.

However, the existing external keyboard needs to be equipped with an additional positioning frame for carrying the tablet computer. During the installation process, the user needs to lift the tablet computer and accurately align the tablet computer with the positioning frame for fixation. Therefore, the existing external keyboard has a complicated structure and is not easy to install.

SUMMARY OF THE DISCLOSURE

The disclosure provides an electronic device, which utilizes a functional element for the first body and the second body to be relatively opened or closed and has the advantages of easy installation and disassembly while achieving the purpose of simplifying the connection structure.

An electronic device of the present disclosure includes a first body, a second body, a functional element and a coupling assembly. The first body has a first sleeve. The second body has a second sleeve. The functional element is disposed on the first body and the second body, and the two ends of the functional element are respectively disposed through the first sleeve and the second sleeve. The coupling assembly is detachably connected to the functional element and is disposed on the first sleeve or the second sleeve. Specifically, the first body and the second body are adapted to be relatively opened or closed through the functional element and the coupling assembly, and the functional element is adapted to be separated from the first sleeve and the second sleeve along an axial direction.

An electronic device of the present disclosure includes a body, a sliding sleeve and a coupling assembly. The sliding sleeve is disposed on the body, and the coupling assembly is disposed in the sliding sleeve; wherein when the sliding sleeve slides to a predetermined position, a portion of the coupling assembly is exposed, and when the sliding sleeve slides to another predetermined position, the coupling assembly is covered.

Based on the above, in the electronic device of the present disclosure, the first body and the second body are respectively a tablet computer and an external keyboard, and the first body and the second body are adapted to be relatively opened or closed to switch to a document mode through the connection of the functional element and the coupling assembly. In addition, the functional element is adapted to be separated from the first sleeve and the second sleeve along an axial direction, thereby disassembling the first body and the second body to switch to the touch mode. Accordingly, the present disclosure achieves the purpose of simplifying the connection structure through the functional element and the coupling assembly.

In order to make the aforementioned features and advantages of the disclosure more comprehensible, embodiments accompanying figures are described in detail below.

BRIEF DESCRIPTION OF THE DRAWINGS

FIG. 5A is a schematic cross-sectional front view of an electronic device according to another embodiment of the present disclosure with a torsion member disposed in a first sleeve.

FIG. 5B is a schematic cross-sectional front view of an electronic device according to another embodiment of the present disclosure with a torsion member disposed in a functional element.

DESCRIPTION OF EMBODIMENTS

Figure 1A:
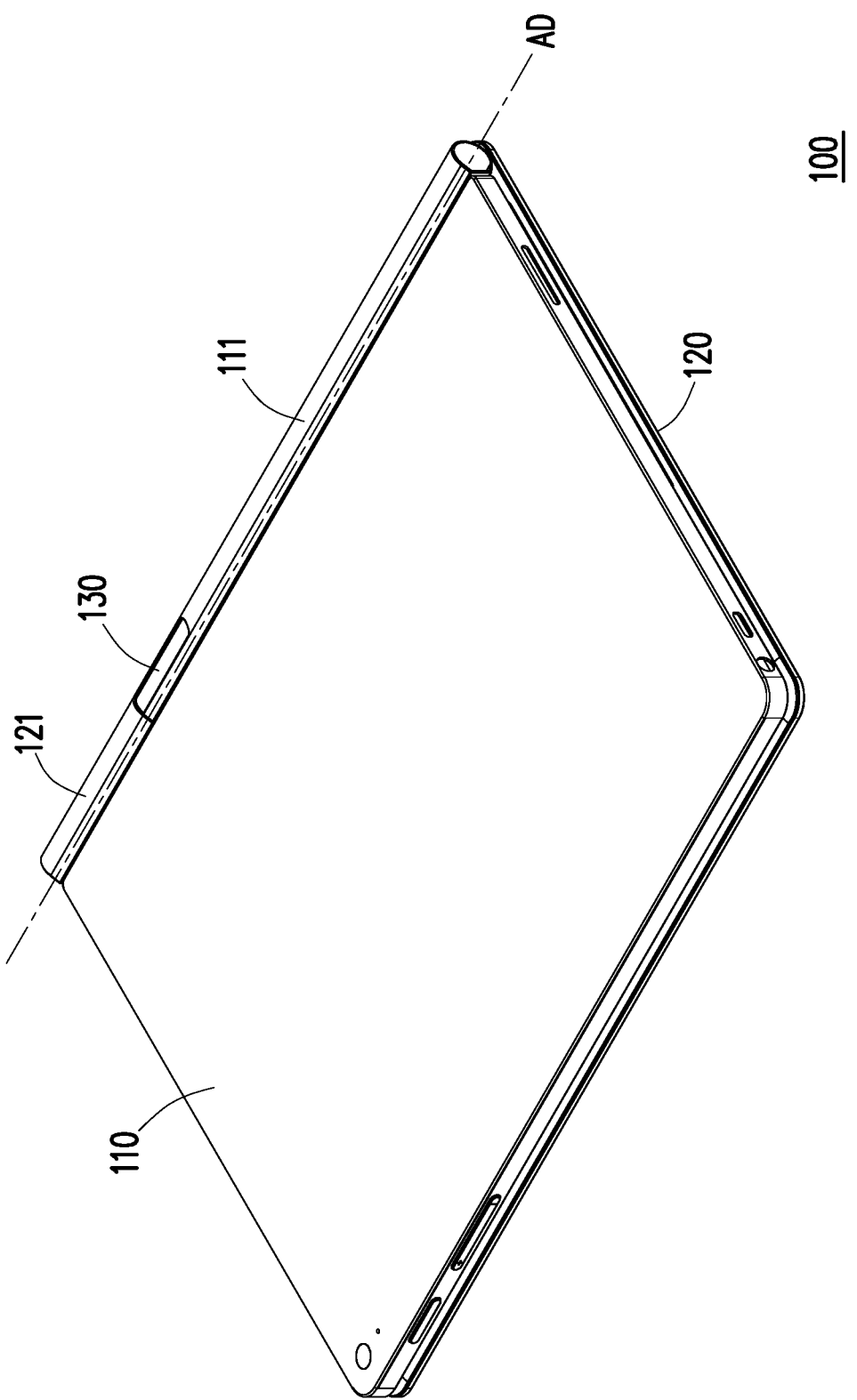
FIG. 1A is a schematic perspective view of an electronic device according to an embodiment of the disclosure.
Figure 1B:
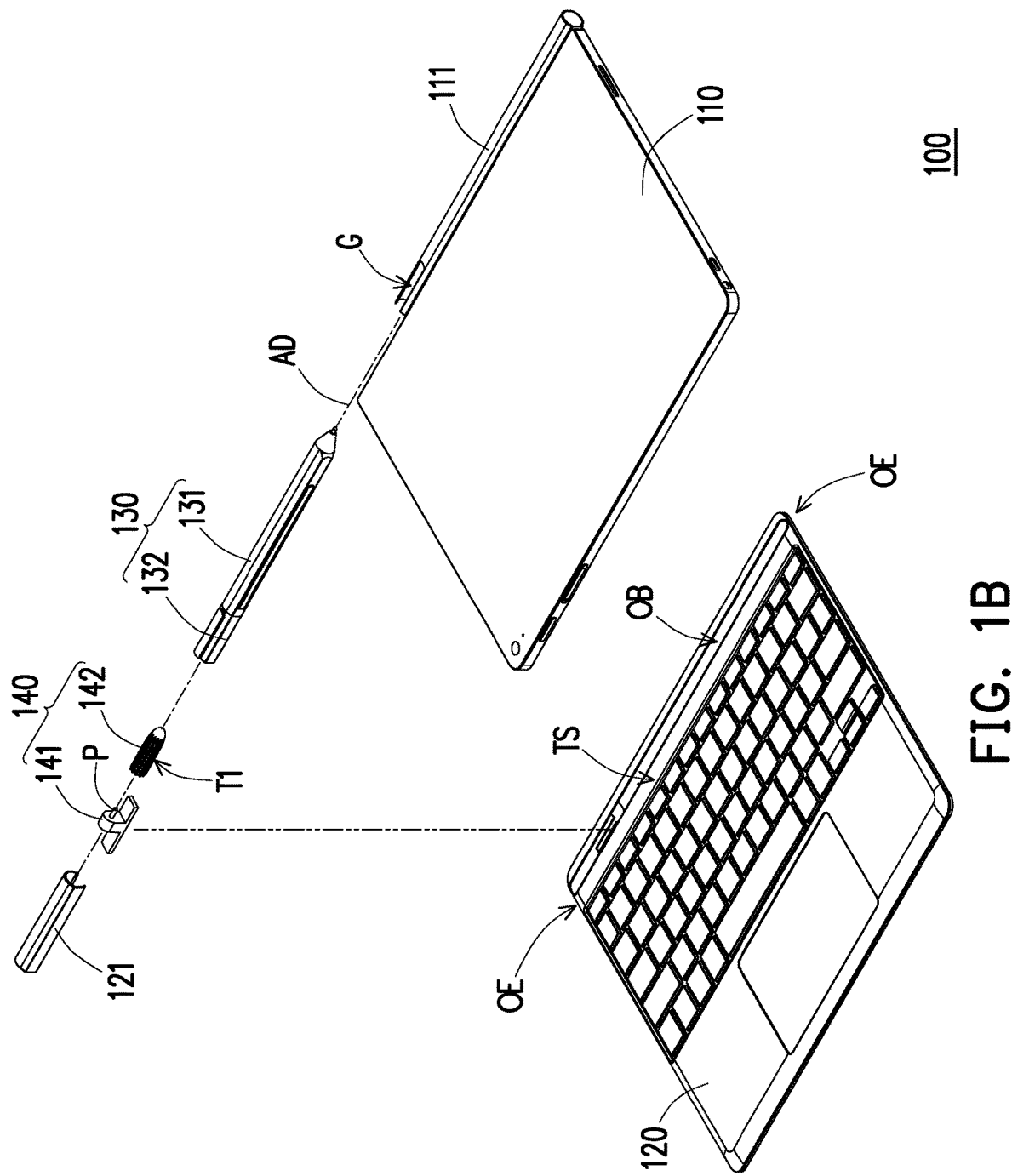
FIG. 1B is a schematic exploded view of elements of the electronic device in FIG. 1A.
Figure 1C:
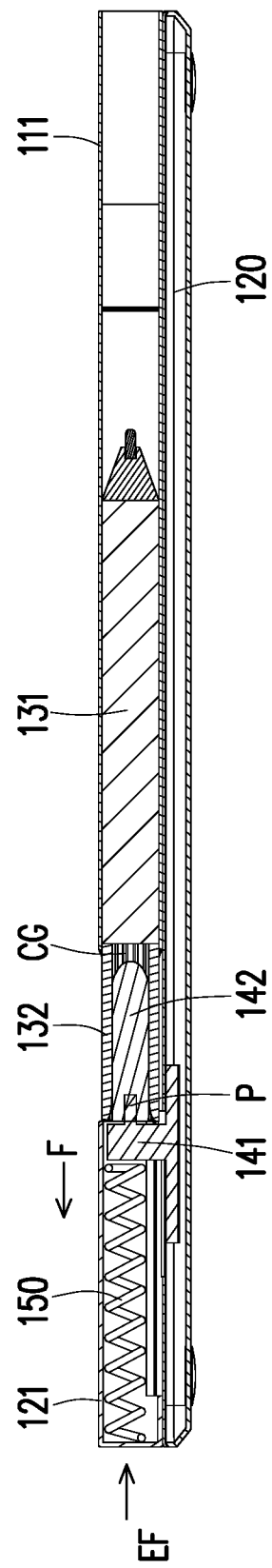
FIG. 1C is a schematic cross-sectional front view of the electronic device in FIG. 1A.

FIG. 1A is a schematic perspective view of an electronic device according to an embodiment of the disclosure. FIG. 1B is a schematic exploded view of elements of the electronic device in FIG. 1A. FIG. 1C is a schematic cross-sectional front view of the electronic device in FIG. 1A.

Referring to FIG. 1A to FIG. 1C, an electronic device 100 of the present embodiment includes a first body 110, a second body 120, a functional element 130, and a coupling assembly 140. Specifically, the electronic device 100 is, for example, a combination of a tablet computer and an external keyboard or an integrally formed notebook computer. In the present embodiment, a first body 110 and a second body 120 are respectively a tablet computer and an external keyboard. The first body 110 has a first sleeve 111 disposed on an outer edge OE of the first body 110. The second body 120 has a second sleeve 121 disposed on a top surface TS of the second body 120.

Further, in the present embodiment, the first body includes a display panel, a touch display panel, a lens, a speaker, or a microphone. The second body includes a keyboard, a touchpad, a lens, a speaker, a microphone, or a fingerprint reader.

A functional element 130 is disposed on the first body 110 and the second body 120, and the two ends of the functional element 130 are respectively disposed through the first sleeve 111 and the second sleeve 121. In the present embodiment, the functional element 130 is, for example, a stylus, a voice recorder, a presenter, a microphone, or a flashlight. The coupling assembly 140 is detachably connected to the functional element 130 and disposed on the first sleeve 111 or the second sleeve 121. In the present embodiment, the coupling assembly 140 is disposed on the top surface TS of the second body 120 and located in the second sleeve 121. In other embodiments, the coupling assembly 140 may also be disposed in the first sleeve 111 of the first body 110 and connected to the functional element 130 depending on the needs, the present disclosure provides no limitation thereto.

Specifically, the first body 110 and the second body 120 are adapted to be relatively opened or closed through the functional element 130 and the coupling assembly 140. In addition, the first sleeve 111, the second sleeve 121, the functional element 130 and the coupling assembly 140 are connected in line, so that the first body 110 and the second body 120 are adapted to be relatively and pivotally rotated along the axial direction AD.

Figure 2A:
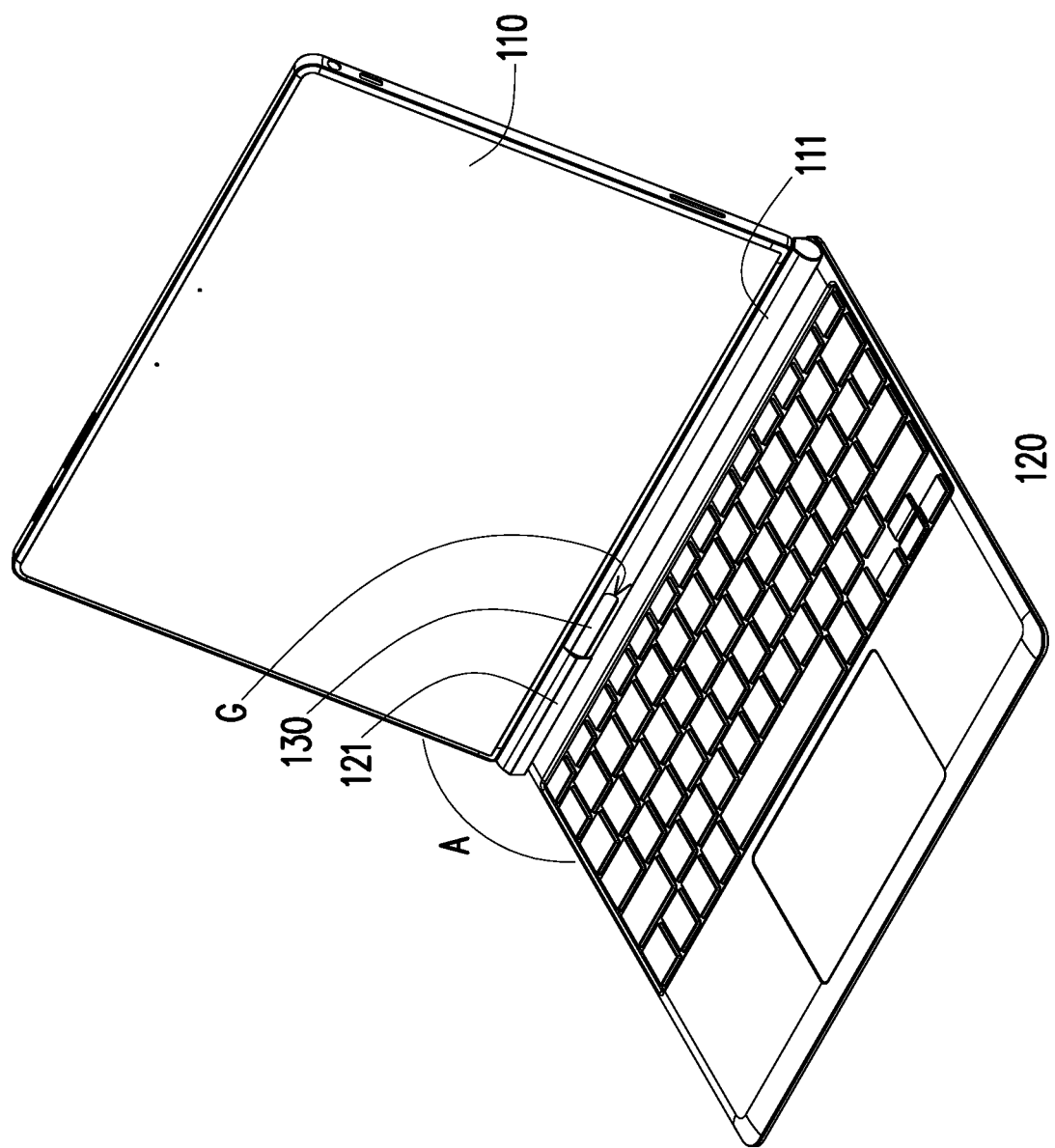
FIG. 2A is a schematic perspective view of the electronic device in FIG. 1A switched to a document mode.
Figure 2B:
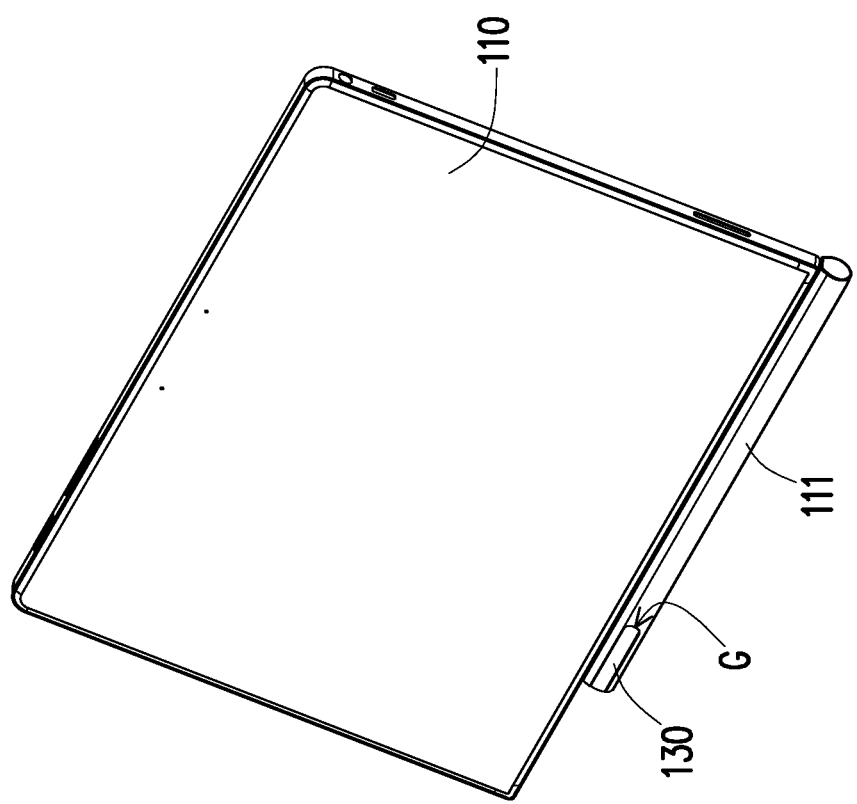
FIG. 2B is a schematic perspective view of the electronic device in FIG. 1A switched to a touch mode.

FIG. 2A is a schematic perspective view of the electronic device in FIG. 1A switched to a document mode. FIG. 2B is a schematic perspective view of the electronic device in FIG. 1A switched to a touch mode.

For example, referring to FIG. 2A, the first body 110 and the second body 120 can be relatively opened to an arbitrary angle A (the angle A in FIG. 2A is greater than 90 degrees) to switch the electronic device to a document mode to meet the user's need. In addition, referring to FIG. 2B, the functional element 130 is adapted to be separated from the first sleeve 111 and the second sleeve 121 along the axial direction AD, thereby disassembling the first body 110 and the second body 120, so that the first body 110 can be used alone to switch the electronic device to a touch mode. Further, referring to FIG. 1A and FIG. 1B, an open slot G is formed on one side of the first sleeve 111 toward the second sleeve 121 for exposing a portion of the functional element 130, which facilitates the user to remove the functional element 130 from the first sleeve 111 to achieve the effect of stylus.

Referring to FIG. 1B and FIG. 1C, the functional element 130 includes a body portion 131 and a latching portion 132. The body portion 131 is disposed through the first sleeve 111 or the second sleeve 121. The coupling assembly 140 includes a fixing base 141 and a connecting portion 142. The fixing base 141 is disposed on the top surface TS of the second body 120 and has a rotating shaft P. The connecting portion 142 is, for example, a male gear and is sleeved around the rotating shaft P to be disposed on the fixing base 141, and the latching portion 132 is, for example, a female gear and is fitted to the connecting portion 142. In detail, the connecting portion 142 is pivotally connected to the fixing base 141 through the rotating shaft P. The latching portion 132 of the functional element 130 is adapted to drive the connecting portion 142 to rotate pivotally relative to the fixing base 141 and generate a torque through friction of the connecting portion 142 and the rotating shaft P, thereby fixing the opening angle A of the first body 110 and the second body 120.

In the embodiment, the latching portion 132 is a female gear and has a spline CG, and the connecting portion 142 is a male cylinder and has a first tooth surface T1. The connecting portion 142 is disposed through the spline CG of the latching portion 132, so that the first tooth surface T1 and the spline CG are engaged with each other and connected as a whole. When an external force F acts on the first body 110, the first sleeve 111 drives the body portion 131, and the latching portion 132 drives the connecting portion 142 to rotate through the engagement of the first tooth surface T1 and the spline CG, and finally the first sleeve 111, the function element 130 and the connecting portion 142 can be rotated pivotally relative to the second sleeve 121 and the fixing base 141 to achieve the effect that the first body 110 is relatively close to or relatively far from the second body 120.

In this embodiment, the body portion 131 and the latching portion 132 of the functional element 130 are separated structures, which means that the latching portion 132 can be removed from the body portion 131, and the body portion 131 still retains the function of stylus. In other embodiments, the body portion 131 and the latching portion 132 may be an integrally formed structure, which means that the body portion 131 and the latching portion 132 are inseparable.

Figure 3A:
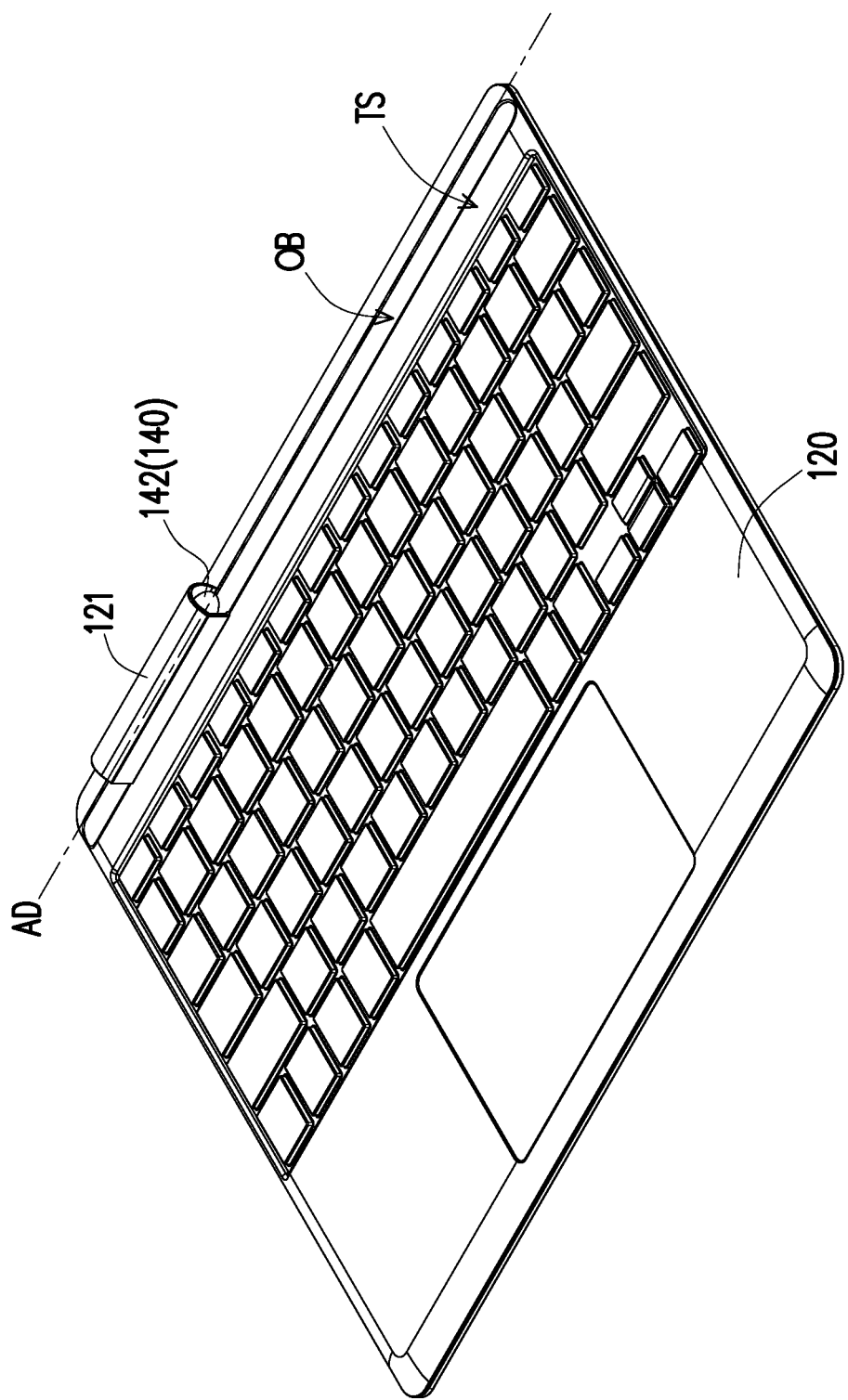
FIG. 3A to FIG. 3B are schematic views showing switching operations of a second body in FIG. 1A.
Figure 3B:
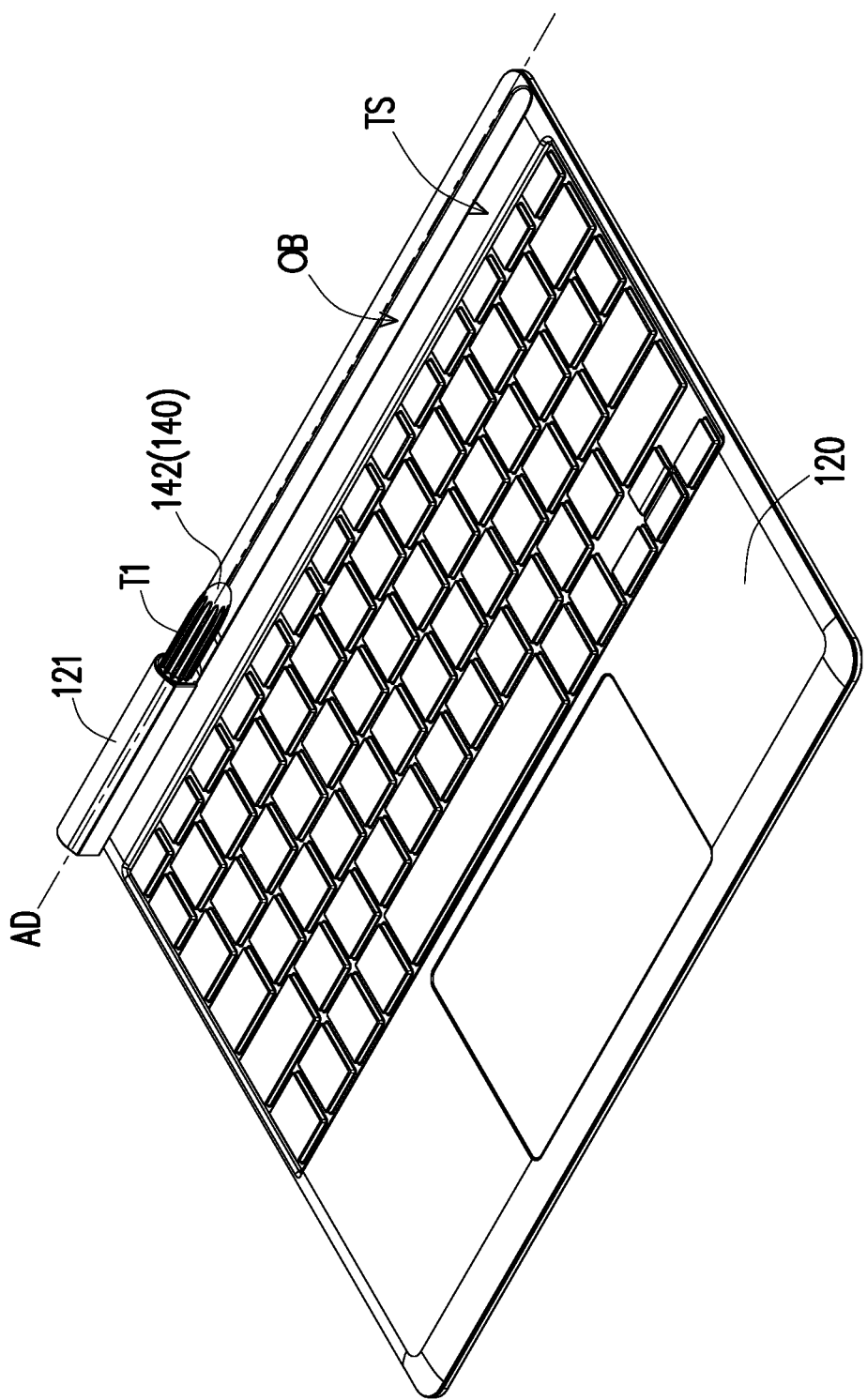

FIG. 3A to FIG. 3B are schematic views showing switching operations of a second body in FIG. 1A.

Please refer to FIG. 1A, FIG. 1C and FIG. 3A. The second sleeve 121 is slidably disposed on the top surface TS of the second body 120, and the coupling assembly 140 is disposed on the top surface TS and located in the second sleeve 121. Further, an elastic member 150, for example, a tension spring is included, and two ends of the elastic member 150 are respectively connected to the inner wall surface of the second sleeve 121 and the fixing base 141 of the coupling assembly 140. Specifically, in the original state, the elastic member 150 is adapted to drive the second sleeve 121 to slide along the axial direction AD and cover the coupling assembly 140. The second sleeve 121 is configured to protect the connecting portion 142 from collision of foreign objects and maintain the simple appearance of the second body 120.

With reference to FIG. 3B, FIG. 1A and FIG. 1C, when the external force F is applied to the second sleeve 121, the second sleeve 121 can slide relative to the second body 120 along the axial direction AD and simultaneously stretch the elastic member 150 to accumulate the elastic force EF, so that the connecting portion 142 is exposed out of the second sleeve 121. On this occasion, the spline CG of the latching portion 132 is adapted to accommodate the connecting portion 142 and engage with the first tooth surface T1, so that the first body 110 and the second body 120 are combined to switch to the document mode.

Referring to FIG. 1A and FIG. 3B, the second body 120 has a guide rail OB disposed on the top surface TS of the second body 120 and extending to two opposite outer edges OE of the second body 120. The second sleeve 121 overlaps the guide rail OB, that is, the length direction LD of the second sleeve 121 is parallel to the extending direction ED of the guide rail OB. The first sleeve 111 is adapted to be positioned on the guide rail OB such that the functional element 130 is aligned with the coupling assembly 140, which means that the guide rail OB is configured to guide the first sleeve 111, ensuring that the functional element 130 is moved along the axial direction AD and combined with the coupling assembly 140.

Referring to FIG. 1A, FIG. 3A and FIG. 3B, in another embodiment, the electronic device of the present disclosure includes the bodies 110 and 120, the sliding sleeves 111 and 121, and the coupling assembly 140. The body is, for example, a display panel, a touchpad or the like. The sliding sleeve is slidably disposed on the bodies 110 and 120. The coupling assembly 140 is disposed in the sliding sleeve and connected to the bodies 110 and 120. Specifically, when the sliding sleeves 111 and 121 slide relative to the bodies 110 and 120 to a predetermined position, a portion of the coupling assembly 140 is exposed to be connected to the external accessories. When the sliding sleeves 111 and 121 slide to another predetermined position (for example, an original position), the coupling assembly 140 is covered, thereby providing an aesthetic effect.

Figure 4A:
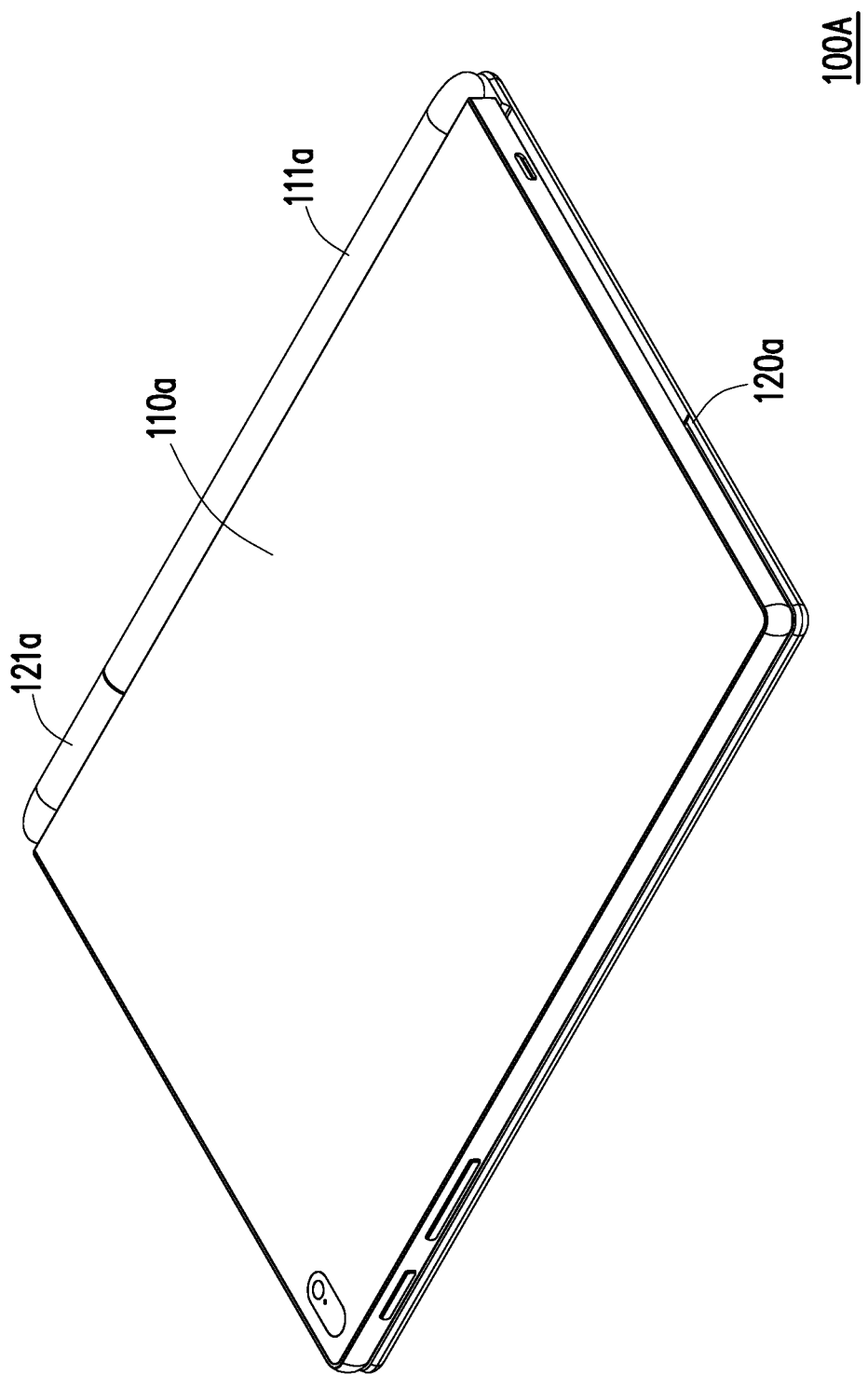
FIG. 4A is a schematic perspective view of an electronic device according to another embodiment of the present disclosure.
Figure 4B:
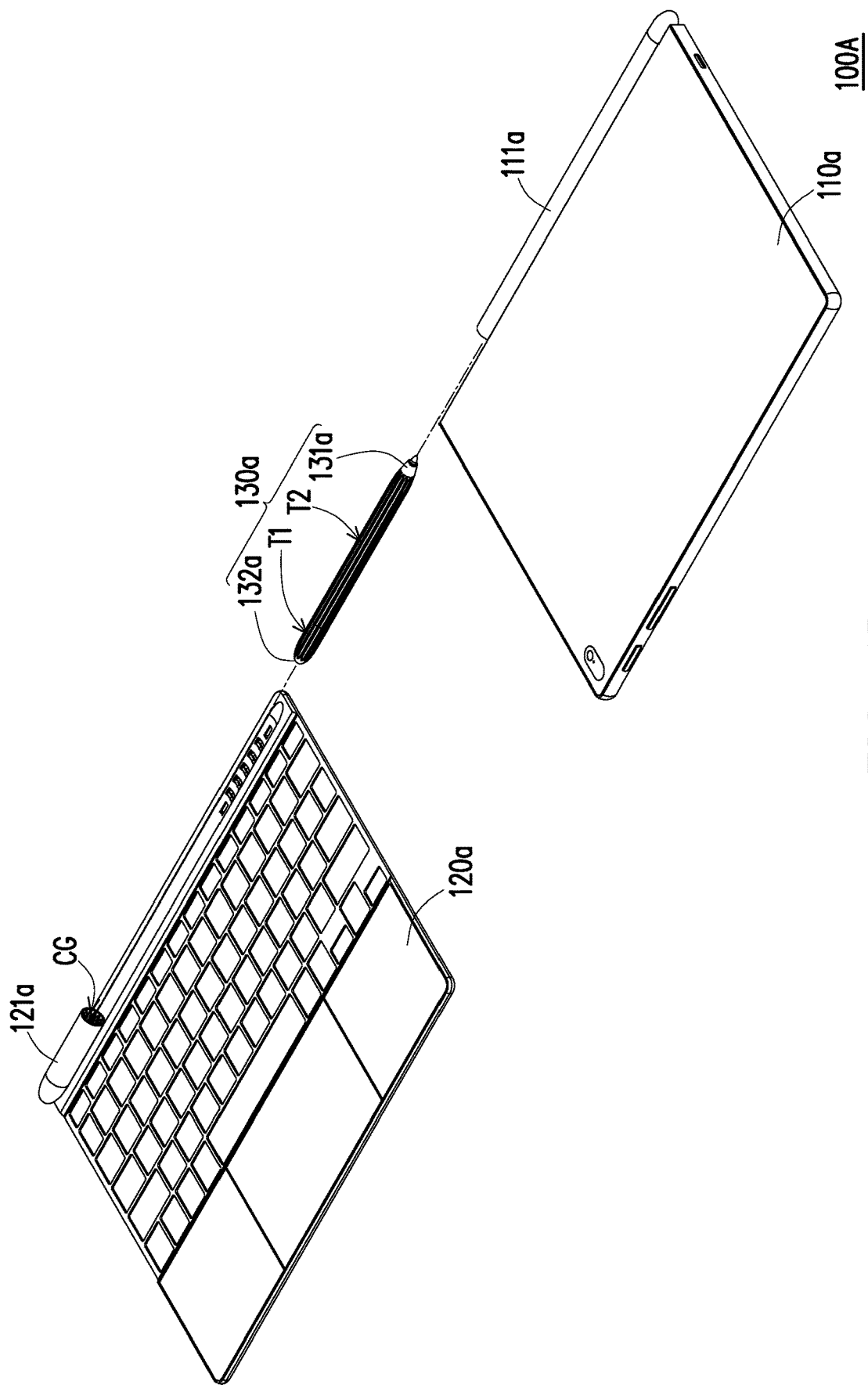
FIG. 4B is a schematic exploded view of elements in the electronic device in FIG. 4A.
Figure 4C:
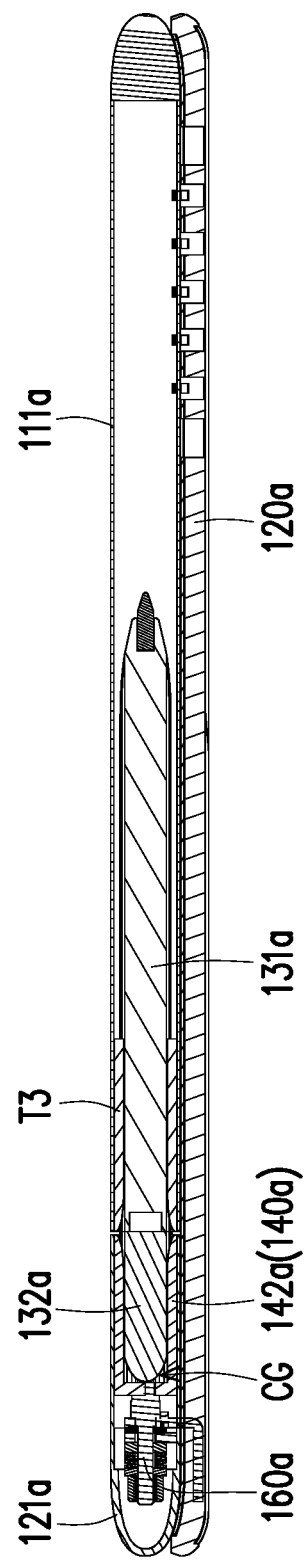
FIG. 4C is a schematic cross-sectional front view of the electronic device in FIG. 4A with a torsion member disposed in a second sleeve.

FIG. 4A is a schematic perspective view of an electronic device according to another embodiment of the present disclosure. FIG. 4B is a schematic exploded view of elements in the electronic device in FIG. 4A. FIG. 4C is a schematic cross-sectional front view of the electronic device in FIG. 4A with the torsion member disposed in the second sleeve.

Referring to FIG. 4A to FIG. 4C, an electronic device 100A of the present embodiment differs from the electronic device 100 of FIG. 1A in that a body portion 131a of a functional element 130a has a second tooth surface T2, and the inner edge of a first sleeve 111a forms a third tooth surface T3. When the body portion 131a is disposed through the first sleeve 111a, the second tooth surface T2 and the third tooth surface T3 are engaged with each other. In detail, the functional element 130a and the first sleeve 111a are latched with each other to prevent the functional element 130a from rotating relative to the first sleeve 111a during the opening or closing process of the first body 110a and the second body 120a.

The connecting portion 142a is, for example, a female gear and rotatably disposed in the second sleeve 121a, and a latching portion 132a is, for example, a male gear and is fitted to the connecting portion 142a. In detail, the latching portion 132a has a first tooth surface T1, and the connecting portion 142a has a spline CG. The latching portion 132a is disposed through the spline CG of the connecting portion 142a, so that the first tooth surface T1 and the spline CG are engaged with each other.

The electronic device 100A further includes a torsion member 160a disposed in the second sleeve 121a and connected to the connecting portion 142a of the coupling assembly 140a for providing a torque when the first sleeve 111a and the coupling assembly 140a rotate relative to the second sleeve 121a, thereby fixing the opening angle A of the first body 110a and the second body 120a.

When the first body 110a is opened or closed relative to the second body 120a, the body portion 131a and the latching portion 132a are driven by the first sleeve 111a to rotate simultaneously, and the connecting portion 142a is driven by the latching portion 132a to rotate relative to the second sleeve 121a. Meanwhile, the connecting portion 142a contacts the torsion member 160a to generate a torque.

FIG. 5A is a schematic cross-sectional front view of an electronic device according to another embodiment of the present disclosure with the torsion member disposed in the first sleeve. Referring to FIG. 5A and FIG. 4C, the difference between the electronic device 100B of the present embodiment and the electronic device 100A of FIG. 4C is that the body portion 131b of the functional element 130b has a second tooth surface T2 (shown in FIG. 4B), and the inner edge of the second sleeve 121b forms a third tooth surface T3. When a portion of the body portion 131b is disposed through the second sleeve 121b, the second tooth surface T2 and the third tooth surface T3 are engaged with each other, and a portion of the body portion 131b is disposed through the first sleeve 111b. In detail, the functional element 130b and the second sleeve 121b are latched with each other to prevent the functional element 130b from rotating relative to the second sleeve 121b during the opening or closing process of the first body 110b and the second body 120b.

The connecting portion 142b is, for example, a female gear and rotatably disposed in the first sleeve 111b, and the latching portion 132a is, for example, a male gear and is fitted to the connecting portion 142a. In detail, the latching portion 132b has a first tooth surface T1, the connecting portion 142b has a spline CG, and the latching portion 132b is disposed through the spline CG of the connecting portion 142b, so that the first tooth surface T1 and the spline CG are engaged with each other.

The electronic device 100B further includes a torsion member 160b disposed in the first sleeve 111b and connected to the connecting portion 142b of the coupling assembly 140b for providing a torque when the second sleeve 121b and the coupling assembly 140b rotate relative to the first sleeve 111b, thereby fixing the opening angle A (please refer to FIG. 2A) of the first body 110b and the second body 120b.

FIG. 5B is a schematic cross-sectional front view of an electronic device according to another embodiment of the present disclosure with a torsion member disposed in a functional element. Referring to FIG. 5B and FIG. 4C, the difference between an electronic device 100C of the present embodiment and the electronic device 100A of FIG. 4C is that a body portion 131c and a latching portion 132c of a functional element 130c are rotatably connected, that is, the body portion 131c and the latching portion 132c are adapted for generating relative rotation.

The body portion 131c of the functional element 130c has a second tooth surface T2, the latching portion 132c has a first tooth surface T1 (the same as shown in FIG. 4B), and the inner edges of a first sleeve 111c and a second sleeve 121c respectively form a third tooth surface T3 and a fourth tooth surface T4. The body portion 131c is disposed through the first sleeve 111c such that the second tooth surface T2 and the third tooth surface T3 are engaged with each other. The latching portion 132c is disposed through the second sleeve 121c such that the first tooth surface T1 and the fourth tooth surface T4 are engaged with each other.

In detail, since the body portion 131c and the first sleeve 111c are latched with each other, and the latching portion 132c and the second sleeve 121c are latched with each other, in the opening or closing process of the first body 110c and the second body 120c, the first sleeve 111c and the second sleeve 121c can respectively drive the body portion 131c and the latching portion 132c to generate relative rotation.

The electronic device 100C further includes a torsion member 160c disposed in the functional element 130c. In the embodiment, the torsion member 160c is disposed in the latching portion 132c and connected to the body portion 131c. In other embodiments, the torsion member 160c is disposed, for example, in the body portion 131c and connected to the latching portion 132c. When the latching portion 132c and the body portion 131c are relatively rotated, the body portion 131c drives the torsion member 160c to generate a torque, thereby fixing the opening angle A (please refer to FIG. 2A) of the first body 110c and the second body 120c.

Figure 6A:
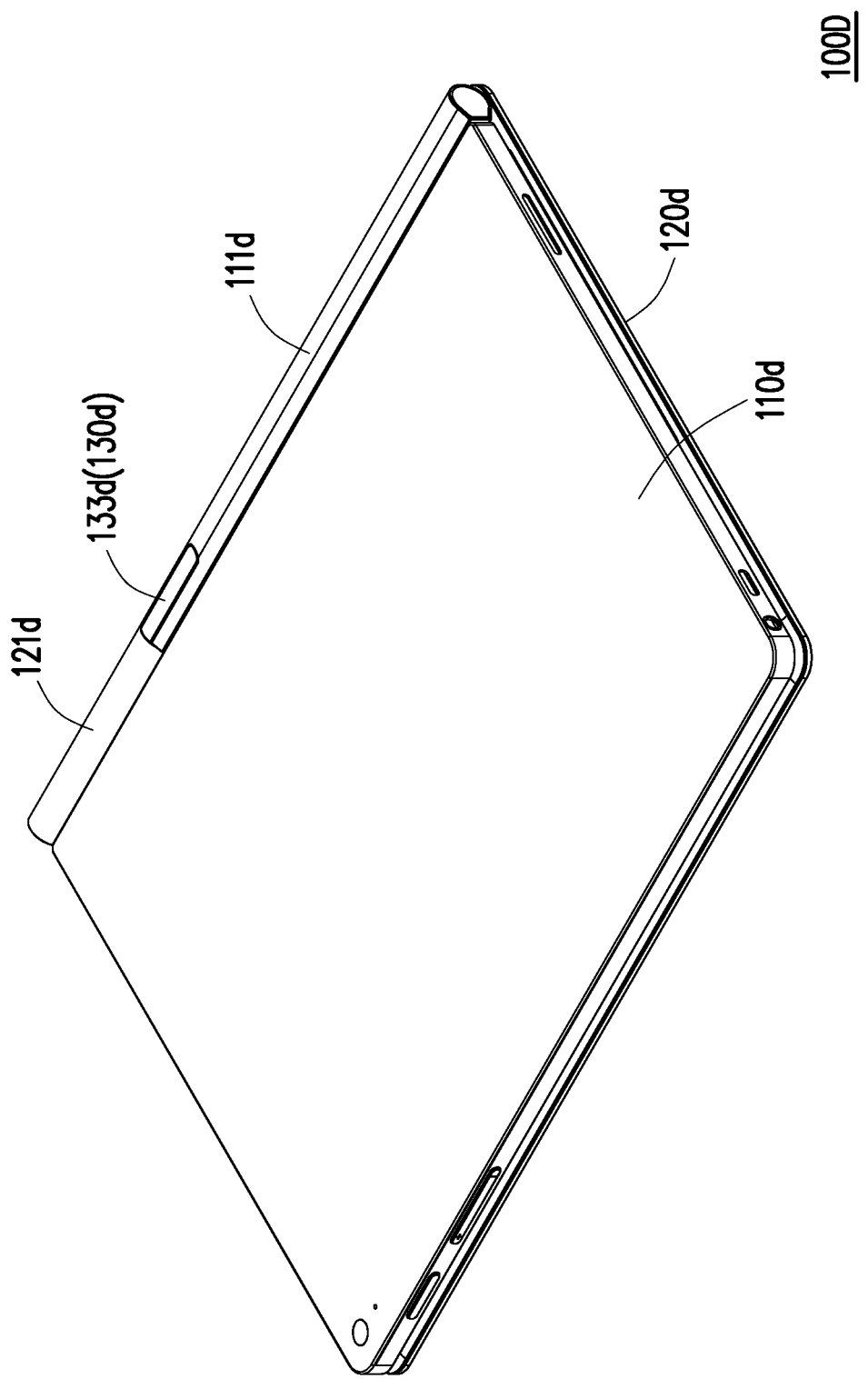
FIG. 6A is a schematic perspective view of an electronic device according to another embodiment of the present disclosure.
Figure 6B:
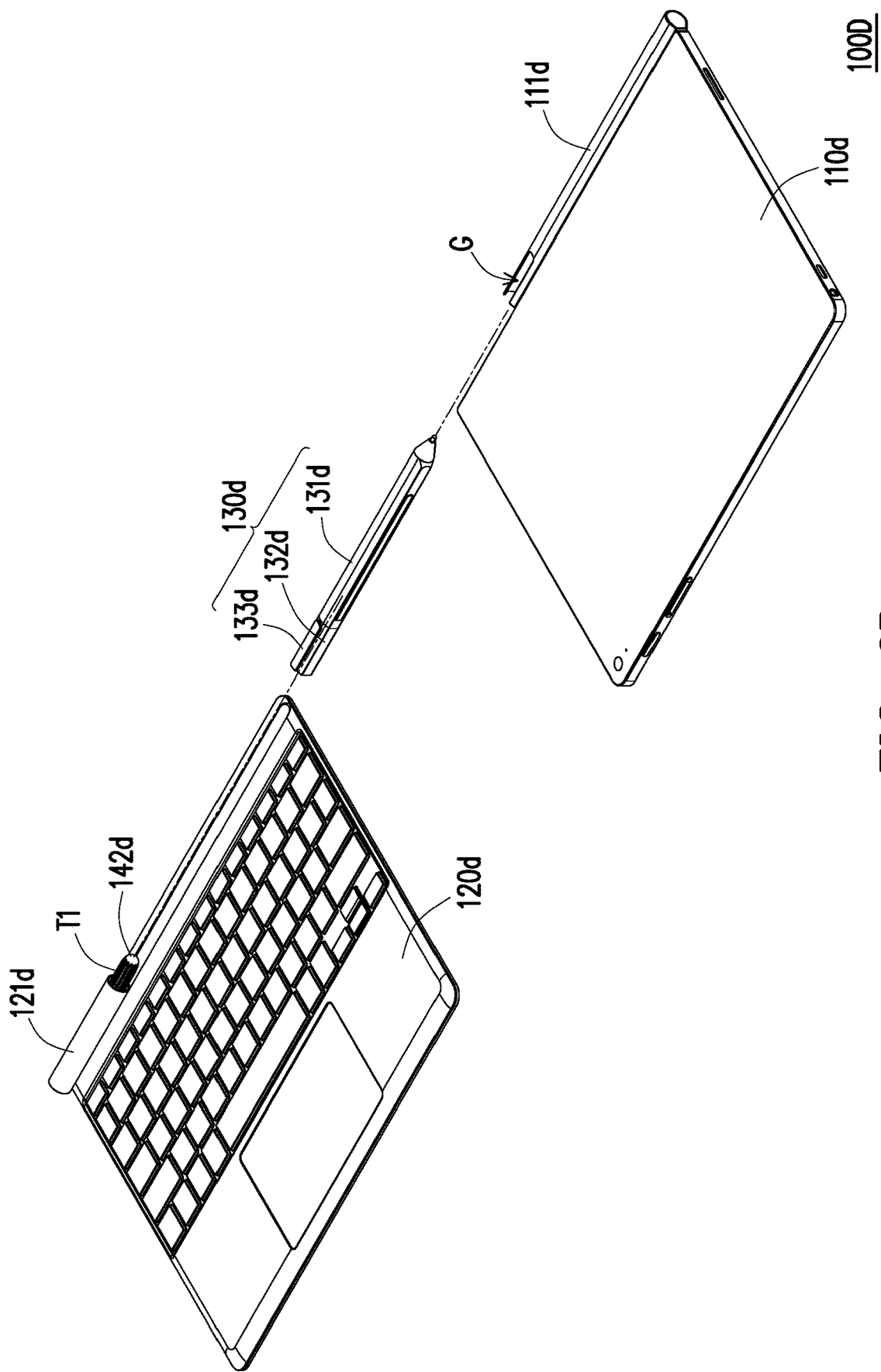
FIG. 6B is a schematic exploded view of elements in the electronic device in FIG. 6A.
Figure 6C:
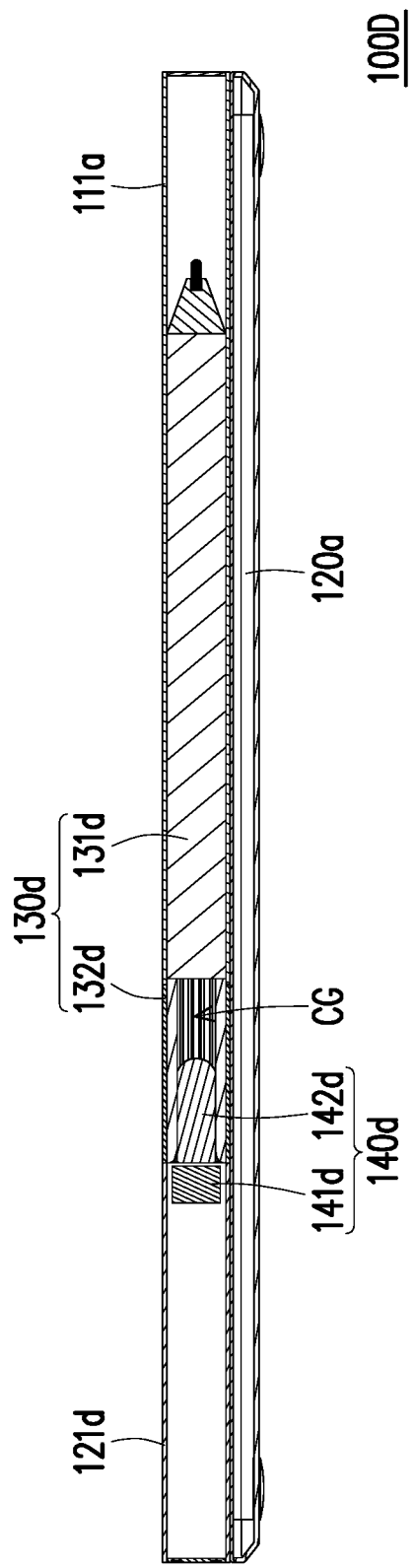
FIG. 6C is a schematic cross-sectional front view of the electronic device in FIG. 6A.

FIG. 6A is a schematic perspective view of an electronic device according to another embodiment of the present disclosure. FIG. 6B is a schematic exploded view of elements in the electronic device in FIG. 6A. FIG. 6C is a schematic cross-sectional front view of the electronic device in FIG. 6A.

Referring to FIG. 6A to FIG. 6C, an electronic device 100D of the present embodiment is different from the electronic device 100 of FIG. 1A in that an open slot G is formed on one side of a first sleeve 111d toward a second sleeve 121d. A functional element 130d has a protrusion portion 133d disposed on a latching portion 132d. The body portion 131d and the latching portion 132d are disposed through the first sleeve 111d, and the protrusion portion 133d is correspondingly engaged with the open slot G for latching with the functional element 130d and the first sleeve 111d, thereby preventing the functional element 130d from rotating relative to the first sleeve 111d.

The coupling assembly 140d includes a torsion portion 141d and a connecting portion 142d. The torsion portion 141d is rotatably disposed in the second sleeve 121d. The connecting portion 142d is, for example, a male gear and is disposed on the torsion portion 141d. The first tooth surface T1 of the connecting portion 142d protrudes out of the second sleeve 121d. The latching portion 132d of the functional element 130d is, for example, a female gear and is fitted to the connecting portion 142d, and the spline CG of the latching portion 132d is engaged with the first tooth surface T1 of the connecting portion 142d.

In detail, the latching portion 132d of the functional element 130d is adapted to drive the connecting portion 142d and the torsion portion 141d to be rotated pivotally relative to the second sleeve 121d, and generate torque through the friction between the torsion portion 141d and the second sleeve 121d, thereby fixing the opening angle A of the first body 110d and the second body 120d.

In summary, in the electronic device of the present disclosure, the first body and the second body are respectively a tablet computer and an external keyboard, and the first body and the second body are adapted to be relatively opened or closed to switch to a document mode through the connection of the functional element and the coupling assembly. In addition, the functional element is adapted to be separated from the first sleeve and the second sleeve along an axial direction, thereby disassembling the first body and the second body to switch to the touch mode. Accordingly, the present disclosure achieves the purpose of simplifying the connection structure through the functional element and the coupling assembly.

In addition, in the electronic device of the present disclosure, the existing functional element is used as the pivoting and connecting structure of the first body and the second body, and additional positioning frame or the placement frame of the functional element is not required, and therefore the volume of the electronic device can be further reduced.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An electronic device, comprising:
   a first body, having a first sleeve;
   a second body, having a second sleeve;
   a first functional element, disposed on the first body and the second body, and two ends of the functional element respectively disposed through the first sleeve and the second sleeve; and
   a coupling assembly, detachably connected to the functional element and disposed on the first sleeve or the second sleeve,
   wherein the first body and the second body are relatively opened or closed through the functional element and the coupling assembly, and the functional element is adapted to be separated from the first sleeve and the second sleeve along an axial direction, and
   the coupling assembly comprises a fixing base and a connecting portion, the fixing base is fixed in the first sleeve or the second sleeve, and the connecting portion is disposed on the fixing base.

2. The electronic device according to claim 1, wherein the first sleeve, the second sleeve, the functional element and the coupling assembly are connected in line such that the first body and the second body are adapted to be pivotally rotated relatively along the axial direction.

3. The electronic device according to claim 1, wherein the connecting portion is pivotally connected to the fixing base, and the functional element is adapted to drive the connecting portion to pivotally rotate relative to the fixing base.

4. The electronic device according to claim 1, wherein the functional element comprises a body portion and a latching portion, the body portion is disposed through the first sleeve or the second sleeve, and the latching portion and the connecting portion are fitted to each other.

5. The electronic device according to claim 3, further comprising a torsion member disposed in the first sleeve and connected to the coupling assembly for providing a torque when the second sleeve and the connecting portion rotate relative to the first sleeve.

6. The electronic device according to claim 3, further comprising a torsion member disposed in the second sleeve and connected to the coupling assembly for providing a torque when the first sleeve and the connecting portion rotate relative to the second sleeve.

7. The electronic device according to claim 4, wherein the body portion and the latching portion are separated structures, and the body portion and the latching portion are rotatably connected to each other.

8. The electronic device according to claim 7, further comprising a torsion member disposed in the functional element to drive the torsion member to generate a torque when the body portion and the latching portion are rotated relative to each other.

9. The electronic device according to claim 7, wherein the latching portion has a first tooth surface, the body portion has a second tooth surface, and inner edges of the first sleeve and the second sleeve respectively form a third tooth surface and a fourth tooth surface, the body portion is disposed through the first sleeve such that the second tooth surface and the third tooth surface are engaged with each other, the latching portion is disposed through the second sleeve such that the first tooth surface and the fourth tooth surface are engaged with each other.

10. The electronic device according to claim 4, wherein the body portion has a second tooth surface, and an inner edge of the first sleeve or the second sleeve forms a third tooth surface, when the body portion is disposed through the first sleeve or the second sleeve, the second tooth surface and the third tooth surface are engaged with each other.

11. The electronic device according to claim 10, wherein the latching portion has a first tooth surface, the connecting portion has a spline, and the latching portion is disposed through the connecting portion such that the first tooth surface is engaged with the spline.

12. The electronic device according to claim 10, wherein the latching portion has a spline, the connecting portion has a first tooth surface, and the connecting portion is disposed through the latching portion such that the first tooth surface is engaged with the spline.

13. The electronic device according to claim 1, wherein the functional element is a stylus, a voice recorder, a presenter, a microphone, or a flashlight.

14. The electronic device according to claim 1, wherein the first body comprises a display panel, a touch display panel, a lens, a speaker or a microphone.

15. The electronic device according to claim 1, wherein the second body comprises a keyboard, a touchpad, a lens, a speaker, a microphone or a fingerprint reader.

16. An electronic device, comprising:
a first body, having a first sleeve;
a second body, having a second sleeve;
a first functional element, disposed on the first body and the second body, and two ends of the functional element respectively disposed through the first sleeve and the second sleeve; and
a coupling assembly, detachably connected to the functional element and disposed on the first sleeve or the second sleeve,
wherein the first body and the second body are relatively opened or closed through the functional element and the coupling assembly, and the functional element is adapted to be separated from the first sleeve and the second sleeve along an axial direction,
an open slot is formed on one side of the first sleeve toward the second sleeve, and the functional element has a protrusion portion engaged with the open slot to combine the functional element with the first sleeve, and
the coupling assembly is pivotally connected to the second sleeve and connected to one end of the functional element toward the second sleeve, the functional element is adapted to drive the coupling assembly to rotate relative to the second sleeve.

17. The electronic device according to claim 16, wherein the coupling assembly comprises a torsion portion rotatably disposed in the second sleeve, and the torsion portion is adapted to rub the second sleeve to generate a torque.

18. An electronic device, comprising:
a first body, having a first sleeve;
a second body, having a second sleeve;
a first functional element, disposed on the first body and the second body, and two ends of the functional element respectively disposed through the first sleeve and the second sleeve;
a coupling assembly, detachably connected to the functional element and disposed on the first sleeve or the second sleeve; and
an elastic member connecting the second sleeve and the coupling assembly,
wherein the first body and the second body are relatively opened or closed through the functional element and the coupling assembly, and the functional element is adapted to be separated from the first sleeve and the second sleeve along an axial direction,
the second sleeve is slidably disposed on a top surface of the second body, the coupling assembly is disposed on the top surface and located in the second sleeve, and
the elastic member is adapted to drive the second sleeve to slide along the axial direction and cover the coupling assembly.

19. An electronic device, comprising:
a first body, having a first sleeve;
a second body, having a second sleeve;
a first functional element, disposed on the first body and the second body, and two ends of the functional element respectively disposed through the first sleeve and the second sleeve; and
a coupling assembly, detachably connected to the functional element and disposed on the first sleeve or the second sleeve,
wherein the first body and the second body are relatively opened or closed through the functional element and the coupling assembly, and the functional element is adapted to be separated from the first sleeve and the second sleeve along an axial direction, and
the second body has a guide rail disposed on a top surface of the second body and extending to two opposite outer edges of the second body, the second sleeve overlaps the guide rail, the first sleeve is adapted to be positioned on the guide rail such that the functional element is aligned with the coupling assembly.

* * * * *